US009807050B2

(12) United States Patent
Siba et al.

(10) Patent No.: US 9,807,050 B2
(45) Date of Patent: Oct. 31, 2017

(54) PROTOCOL ADDRESSING FOR CLIENT AND DESTINATION IDENTIFICATION ACROSS COMPUTER NETWORKS

(71) Applicant: Cisco Technology, Inc., San Jose, CA (US)

(72) Inventors: Lucas Siba, Langley (CA); Scott Cressman, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 14/687,622

(22) Filed: Apr. 15, 2015

(65) Prior Publication Data

US 2016/0308821 A1 Oct. 20, 2016

(51) Int. Cl.
*G06F 15/16* (2006.01)
*H04L 29/12* (2006.01)
(Continued)

(52) U.S. Cl.
CPC .... *H04L 61/2007* (2013.01); *H04L 29/12066* (2013.01); *H04L 41/0893* (2013.01);
(Continued)

(58) Field of Classification Search
CPC . H04L 41/0893; H04L 63/20; H04L 61/1511; H04L 63/0281; H04L 67/28;
(Continued)

(56) References Cited

U.S. PATENT DOCUMENTS 6,907,525 B2 6/2005 Pazi et al.
7,228,359 B1 6/2007 Monteiro
(Continued)

FOREIGN PATENT DOCUMENTS

WO WO01/41401 A2 6/2001
WO 2015/030270 A1 3/2015

OTHER PUBLICATIONS

International Search Report and Written Opinion in counterpart International Application No. PCT/US2016/027375, dated Jun. 27, 2016, 9 pages.
(Continued)

*Primary Examiner* — David Lazaro

(57) ABSTRACT

Internet protocol addressing to uniquely identify clients and destinations across computer networks is provided. Communication between a proxy service and a DNS nameserver is facilitated to permit the DNS nameserver to send a subscriber identifier to the proxy service in response to a DNS request for a flagged domain name. The proxy service selects a unique IP address from a pool of IP addresses assigned to the proxy service. The proxy service associates the selected IP address with the subscriber identifier and optionally, the target domain name of the DNS request. The proxy service provides the unique IP address to the DNS nameserver which returns the unique IP address to the client device for the target domain name. The subscriber can then be authenticated at the proxy service transparently without input from the subscriber or client device based on the unique IP address provided by the client device to the proxy service.

21 Claims, 10 Drawing Sheets

(51) Int. Cl.
*H04L 29/06* (2006.01)
*H04L 12/24* (2006.01)
*H04L 29/08* (2006.01)

(52) U.S. Cl.
CPC ...... *H04L 61/1511* (2013.01); *H04L 63/0281* (2013.01); *H04L 63/20* (2013.01); *H04L 67/28* (2013.01)

(58) Field of Classification Search
CPC ............. H04L 29/12066; H04L 65/105; H04L 67/2804; H04L 67/2814
See application file for complete search history.

(56) References Cited

U.S. PATENT DOCUMENTS

| | | | |
|---|---|---|---|
| 7,313,815 B2 | 12/2007 | Pazi et al. | |
| 7,412,515 B2 | 8/2008 | Kupst et al. | |
| 7,698,375 B2 | 4/2010 | Hinton et al. | |
| 8,224,994 B1 | 7/2012 | Schneider | |
| 8,561,161 B2 | 10/2013 | Blakley et al. | |
| 8,677,451 B1 | 3/2014 | Bhimaraju et al. | |
| 8,694,642 B2 | 4/2014 | Dempsky et al. | |
| 8,966,122 B2 * | 2/2015 | Treuhaft | H04L 61/1511 709/245 |
| 9,413,714 B2 * | 8/2016 | Treuhaft | |
| 2005/0044352 A1 * | 2/2005 | Pazi | H04L 29/12066 713/153 |
| 2005/0097179 A1 | 5/2005 | Orme | |
| 2006/0002308 A1 | 1/2006 | Na et al. | |
| 2006/0023744 A1 | 2/2006 | Chen et al. | |
| 2006/0224725 A1 * | 10/2006 | Bali | H04L 67/1002 709/224 |
| 2007/0239865 A1 | 10/2007 | Tout | |
| 2007/0294419 A1 | 12/2007 | Ulevitch | |
| 2009/0113074 A1 | 4/2009 | Statia et al. | |
| 2009/0157889 A1 | 6/2009 | Treuhaft | |
| 2010/0257232 A1 | 10/2010 | Joffray et al. | |
| 2010/0274970 A1 | 10/2010 | Treuhaft et al. | |
| 2011/0019547 A1 | 1/2011 | De Lutiis et al. | |
| 2012/0117649 A1 | 5/2012 | Holloway et al. | |
| 2012/0124645 A1 | 5/2012 | Ratica et al. | |
| 2012/0158969 A1 | 6/2012 | Dempsky et al. | |
| 2012/0198034 A1 * | 8/2012 | Avirneni | H04L 61/1511 709/221 |
| 2012/0278467 A1 | 11/2012 | Schneider | |
| 2013/0166520 A1 | 6/2013 | Vass | |
| 2013/0254423 A1 | 9/2013 | George, IV | |
| 2013/0275570 A1 | 10/2013 | Treuhaft et al. | |
| 2014/0089661 A1 * | 3/2014 | Mahadik | H04L 61/1511 713/162 |
| 2014/0215092 A1 | 7/2014 | Dempsky et al. | |
| 2015/0256508 A1 * | 9/2015 | Townsend | H04L 61/20 709/245 |
| 2016/0308821 A1 * | 10/2016 | Siba | H04L 61/1511 |

OTHER PUBLICATIONS

Daniel Behrens, "Gesperrte Web-Dienste per DNS-Trick freischalten—PC-WELT", Dec. 23, 2014, XP055280840, retrieved from the internet on Jun. 15, 2016, URL:http://www.pcwelt.de/ratgeber/Gesperrte_Web-Dienste_per_DNS-Trick_freischalten-Smart_DNS-8990013.html, XX pages.

* cited by examiner

PROTOCOL ADDRESSING FOR CLIENT AND DESTINATION IDENTIFICATION ACROSS COMPUTER NETWORKS

BACKGROUND OF THE INVENTION

Field of the Invention

Embodiments in accordance with the present disclosure relate to computer networks, and particularly to processing domain name system (DNS) information.

Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

While early network implementations could utilize a single periodically distributed ASCII file to translate between domain names and IP addresses, modern networks such as the Internet rely on the domain name system (DNS) for the resolution of names and addresses. FIG. 1 is a simplified block diagram illustrating traditional DNS processing. A client computing device 102 includes a resolver 104 for initiating DNS requests. The resolver may be a standalone component such as a software module of the client, or may be embedded within various applications such as web browsers, file transfer protocol programs, email applications, and the like that utilize Internet resources. When the client requests an Internet resource such as a web page or delivery of an email message, the resolver is charged with determining the IP address(es) of the requested resource so that the appropriate request can be issued to the appropriate address. The resolver is traditionally configured with the addresses of a group of ISP DNS nameservers 110 that handle recursive DNS processing for the client device. As is often the case, the group of nameservers is provided by the Internet Service Provider (ISP) for the client device, although this isn't required. Nameservers 110 are recursive nameservers which resolve DNS requests using a recursive process that accesses various other nameservers in order to satisfy a given query.

Consider an example DNS request 150 from client 102 to nameserver 112 for the domain name information of "www.opendns.com". The ISP DNS nameserver first checks a local cache to attempt to resolve the request. The ISP DNS nameserver maintains the local cache with domain name records that have already been resolved to improve performance in responding to subsequent DNS requests. If nameserver 112 is maintaining the requested domain name in the local cache, it will issue a DNS response 152 to the client with the domain name record including the IP address of "www.opendns.com".

If the ISP DNS nameserver 112 does not have an entry for the requested domain name, it will launch recursive processing using authoritative DNS nameservers 120 and/or root DNS nameservers 130. An authoritative nameserver maintains an authoritative or master list for a zone which is a group of computing devices. Recursive DNS nameservers obtain domain name information such as the IP address of a requested resource from authoritative nameservers. The root DNS nameservers are also authoritative DNS nameservers. They are called root DNS nameservers because they contain the authoritative domain name information for a set of top level domains (TLDs) in the so-called root zone. For example, the root DNS nameservers contain the IP addresses for finding domain name information for lower level domains in the top level domains. The top level domains include the generic top-level domains (gTLD) of .com, .org, .net, etc.

Nameserver 112 first issues a DNS request 154 to root DNS nameservers 130. The root DNS nameservers 130 can include multiple nameservers, one or more of which can be issued a request for the needed information. One of the nameservers 132 responds with a DNS response 156 including the IP address of one or more authoritative nameservers for the ".com" domain. When ISP DNS nameserver 112 obtains the IP address for the ".com" domain, it issues another DNS request 158 to the specified one of the authoritative DNS nameservers 120. The specified authoritative nameserver will issue a DNS response 160 with the IP address of one or more nameservers for the "opendns.com" domain. This process repeats between the ISP DNS nameserver and the authoritative nameservers 120 until the ISP DNS nameserver receives the IP address for "www.opendns.com". The client 102 application can then issue the resource request to the appropriate computer, such as an HTTP request to the server at the corresponding IP address.

FIG. 2 is a simplified block diagram of a typical authoritative DNS nameserver 120 as shown in FIG. 1 that can store domain name records. In this example, the authoritative DNS nameserver 120 is a computer system with a processor 250 coupled to a communications interface 260 and a memory or storage 270 via a system bus 252. The communications interface 160 exchanges data with a communications network, such as the Internet, via line 154. The processor 250 receives DNS requests from the Internet and resolves the DNS requests based on domain name records, such as a DNS record 280 stored in memory 270. The DNS record 280 includes a domain name 282, which is used as a key to lookup a corresponding IP address 284, and includes a time-to-live (TTL) value 286. The TTL value for the DNS record can be set by the administrator of the authoritative DNS nameserver. The TTL value is provided as part of the DNS response to DNS requests and is used by the receiving nameservers to control how long the DNS record should be maintained and treated as valid.

Traditional network processing may use a proxy server to route or process network traffic on behalf of client devices. Network resource requests for a target domain name may be received by the proxy server from a client device. The proxy server attempts to identify the originally intended destination address for the client request. If the original destination can be determined, the proxy server can issue a request to the target IP address on behalf of the client. Sometimes, however, the proxy server may be unable to determine the original destination address. Request headers in HTTP traffic, for example, will often contain the destination IP address or an indication of the destination IP address. For other network protocols and sometimes for HTTP traffic as well, no indication of the destination IP address can be determined and the proxy server may be forced to drop the network traffic.

DETAILED DESCRIPTION

Figure 1:
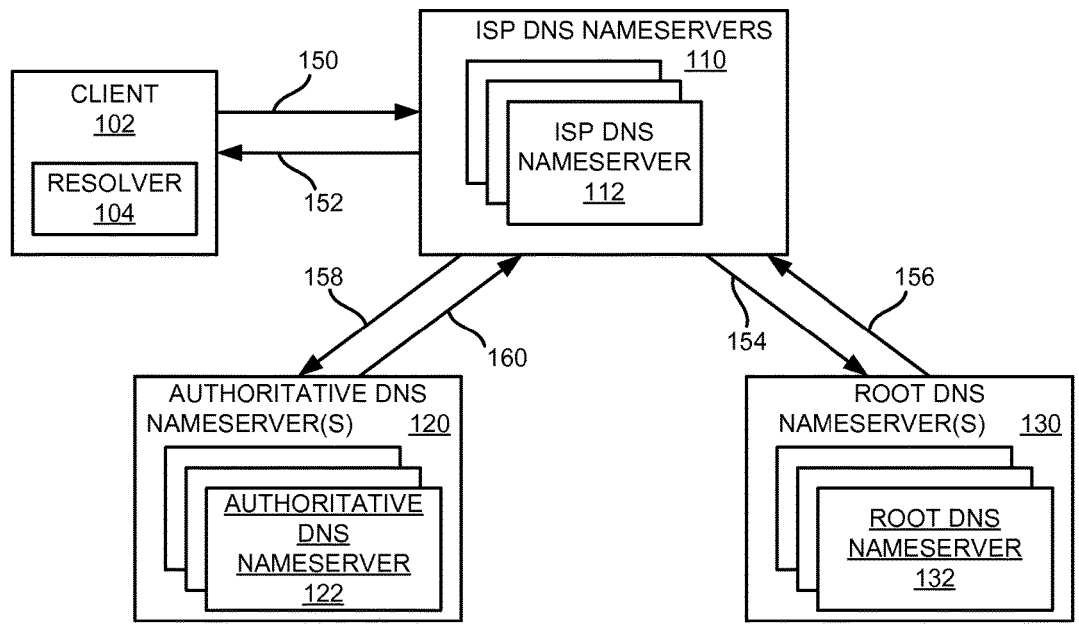
FIG. 1 is a simplified block diagram of a computer network depicting a domain name system (DNS) for processing DNS requests.
Figure 2:
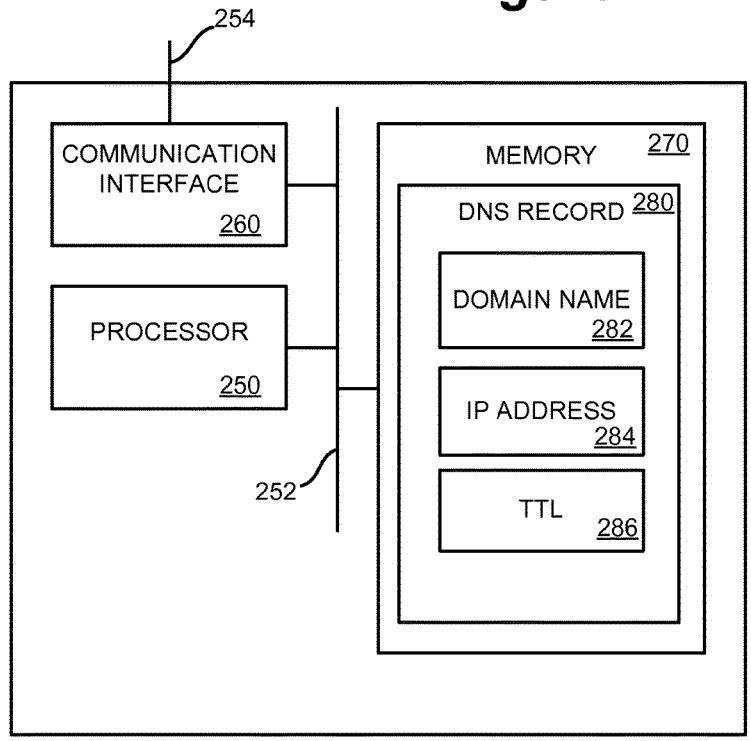
FIG. 2 is a simplified block diagram of an example of an authoritative DNS nameserver.

Systems and methods for internet protocol addressing to uniquely identify clients and destinations across computer networks are provided. Communication between a proxy service and a DNS nameserver is facilitated to permit the proxy service to determine a subscriber identifier from the DNS nameserver. In response to a request for a flagged domain name from a client device, the nameserver issues a message to the proxy service with the subscriber identifier and optionally, the target domain name and/or original DNS request. The proxy service selects a unique IP address from a pool of available IP addresses and associates the unique IP address with the subscriber identifier and optionally, the target domain name. The proxy service provides the unique IP address to the DNS nameserver which returns the unique IP address to the client device for the target domain name. The subscriber can then be authenticated at the proxy service transparently without input from the subscriber or client device based on the IP address provided to the proxy service by the subscriber.

In one embodiment, domain name system requests are processed in accordance with subscriber information to determine whether to provide domain name information for a target domain or alternate domain name information for a proxy service. If the system determines that network traffic associated with a subscriber should be routed to the proxy service, a unique internet protocol address is selected. The system associates the selected IP address with the subscriber and optionally the target domain name of the DNS request. The system responds to the DNS request with the selected IP address that has been associated with the subscriber. The proxy service receives subsequent network traffic from a client device of the subscriber using the selected IP address. The proxy service identifies the subscriber and optionally the target domain name based on the selected IP address. The proxy service determines subscriber information for the subscriber using the selected IP address. The proxy service processes the network traffic based on the subscriber information associated with the subscriber. In this manner, the system is able to communicate clearly to the proxy service the intended destination of the subscriber's request. Moreover, the system may uniquely identify the subscriber across both the DNS request and subsequent network traffic that is routed to the proxy service.

In one embodiment, the system includes a proxy service that maintains an internet protocol address pool. The pool includes a set of internet protocol addresses that are assigned or otherwise routed to the proxy service. The system includes a DNS nameserver that accesses subscriber information and domain name information to respond to requests from client devices for domain name information. The DNS nameserver determines a subscriber identifier associated with each DNS request. If subscriber information indicates that network traffic for a target domain name should be routed to the proxy service, the DNS nameserver generates a message to the proxy service. The message includes the subscriber identifier, and optionally the target domain name and/or additional information such as the original DNS request or more subscriber information.

In response to a message from the DNS nameserver, the proxy service accesses the IP address pool to select an available IP address. The proxy service associates the selected IP address with the subscriber identifier in the message. The proxy service also associates the selected IP address with the target domain name in one embodiment. The proxy service responds to the message from the DNS nameserver with the selected IP address.

The client receives the DNS response from the DNS nameserver. The client issues one or more resource requests to the proxy service using the selected IP address. The proxy service receives the resource request from the client. The proxy service determines the subscriber identifier for the resource request based on the association of the IP address in the request with the subscriber identifier at the proxy service. The proxy service accesses subscriber information for the subscriber identifier and processes the resource request using the subscriber information. For example, the proxy service may proxy the request on behalf of the client, drop the request, or directly route the request to the destination IP address.

In this manner, the proxy service may operate transparently without requiring explicit user interaction for authentication. The proxy service authenticates subscribers seamlessly based on the supplied IP address, which is mapped to a specific subscriber identifier. The proxy service can determine a subscriber identifier and optional subscriber information for use in proxying client resource requests. The subscriber identifier and information can be determined from the communication exchange with the DNS nameserver without requiring user intervention for authentication.

Figure 3:
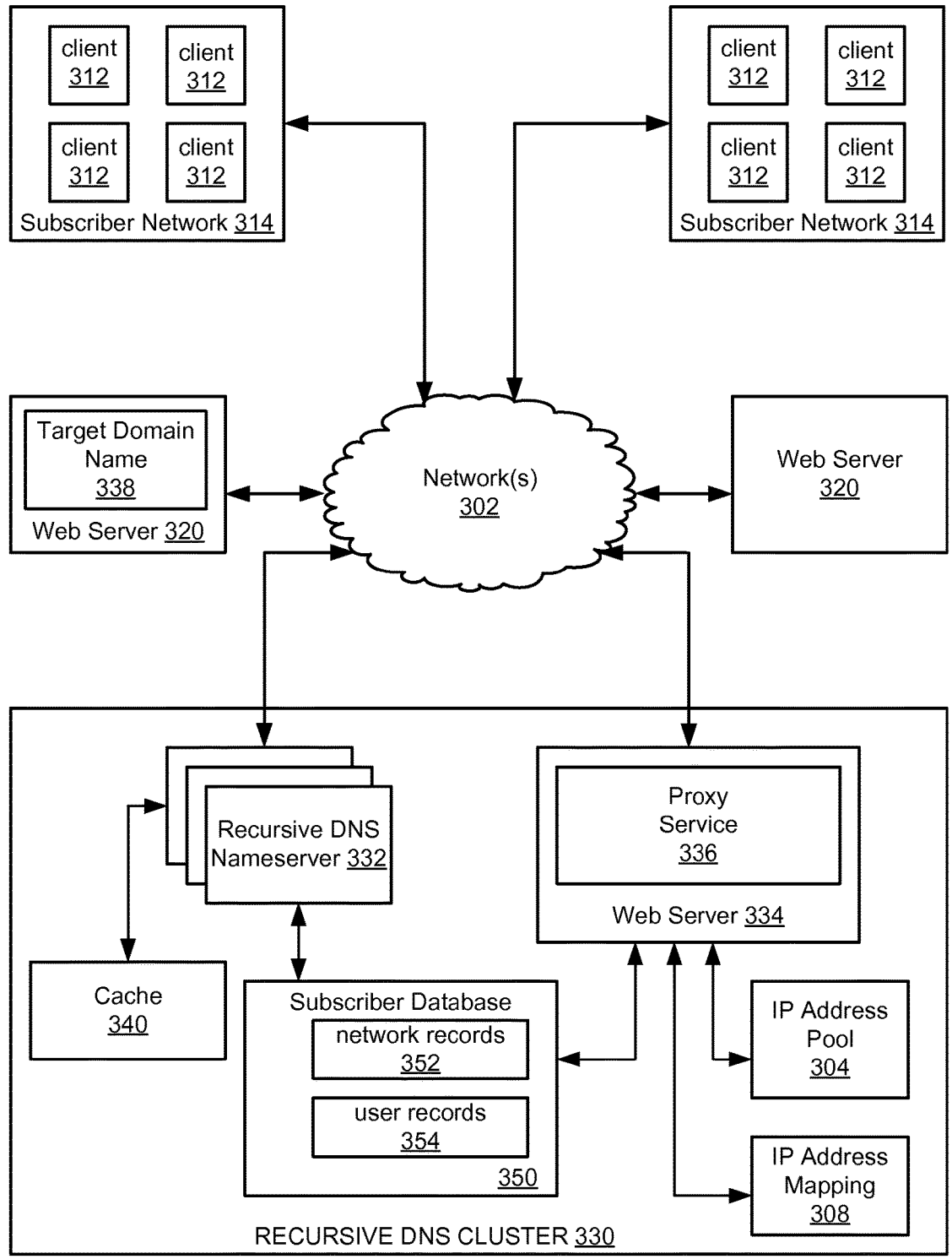
FIG. 3 is a simplified block diagram of a computing system including a recursive DNS nameserver in accordance with one embodiment of the disclosed technology.

FIG. 3 is a block diagram of a system for processing domain name system (DNS) requests and providing a proxy service in accordance with an embodiment of the present disclosure. Subscriber networks 314, web servers 320 and a recursive DNS cluster 330 are each in communication with one or more network(s) 302. Although two subscriber networks with four client devices 312 each are shown, any number of subscriber networks or client devices may be used.

Network(s) 302 and 314 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information and/or to process network-related resource requests. While the cluster in FIG. 3 is depicted with multiple recursive DNS nameservers, other embodiments may include a single computing system within a cluster such as a single server. The individual recursive nameservers in a cluster can be formed of hardware and/or software configured as described for domain name resolution and network processing. By way of non-limiting example, the various nameservers can include personal computers, servers, workstations, mainframes, etc.

Each of the recursive DNS nameservers in a cluster resolves requests for domain name information from computing devices such as client devices 312 operated by individual users on a subscriber network 310. The nameservers 332 in cluster 330 include or are in communication with a local cache 340 and a subscriber database 350. The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The cache 340 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request.

When DNS requests from clients 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative nameservers to determine the requested domain name information.

A response can also include a packet, cell, message, or signal used for transmitting domain name information. A Uniform Resource Identifier (URI) identifies resources available through network hosts. Some examples of URIs include protocols such as http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URI such as a URL includes domain names that form a portion of the URL.

In response to a DNS request for domain name information associated with a domain name, a recursive DNS nameserver within a cluster can determine a subscriber identifier. A subscriber is generally an individual and/or entity that agrees to service conditions of an operator of a recursive DNS cluster 330. Subscribers may range from entities operating large networks 314, such as those provided by a wireless service providers or large corporations, to individuals having a home internet connection. It is noted that while subscriber networks 314 are depicted with multiple client devices 312, that is not required. In one example, the subscriber may operate a single personal computer with an internet connection comprising subscriber network 314. Subscriber network may be any home, corporate, or mobile network to which a subscriber connects. Embodiments in accordance with the present disclosure may be applied in any type of environment.

A subscriber identifier discriminates the subscriber associated with the request for domain name information. Some examples of subscriber identifiers are IP addresses, userID's, deviceID's, and secure tokens. If an IP address identifier is used, the recursive DNS nameserver can inspect the network packet containing the request to determine the source IP address of the packet. A username or secure token may be included in the request for domain information from which the recursive DNS nameserver determines the subscriber identifier and the subscriber information. Some subscribers may be associated with multiple users. Accordingly, a subscriber identifier may identify a subscriber and optionally a particular user associated with the subscriber where a subscriber includes multiple users. Reference to a subscriber identifier hereinafter includes an identifier of a subscriber as well as an identifier of a particular user associated with a subscriber.

In one example, a device or application on a subscriber's network is setup to modify DNS requests to include a subscriber identifier. For example, an extension of the DNS protocol can be used such as EDNS which allows more flags, label types and return codes to be defined. EDNS may allow the sender of a DNS message (e.g., client device 312) to advertise its own extended capabilities to the message receiver (e.g., DNS nameserver 332). This may be accomplished through the inclusion of an OPT pseudo-RR in the additional data section of a request or response. The OPT pseudo-RR may include one or more EDNS options. In one example, a client device 312 can supply a device ID to DNS nameserver 332 as a subscriber identifier. For example, a proprietary device ID key/value pair in an OPT resource record (RR) may be provided in the additional section of a DNS query. The RR can appear in the DNS query's additional section, causing DNS nameserver 332 to interpret the last eight octets of the section as a device ID. The device ID can act as an index into a database of subscriber information associated with DNS nameserver 332. Other subscriber identifiers and techniques for determining the same can be used.

The recursive DNS nameserver resolves requests for domain name information based on subscriber information associated with the subscriber identifier to generate a response in one embodiment. The recursive DNS nameserver then returns the response to the client device, providing the resolved domain name information in accordance with the subscriber information. By way of example, the recursive DNS nameserver may obtain the network (e.g., IP) address in the domain name record of a requested domain name for a first subscriber. For a second subscriber, the recursive DNS nameserver instead may obtain a substitute network (e.g., IP) address that satisfies a substitution criterion for the requested domain name based on the subscriber information.

In some embodiments, a subscriber of a service provided by the DNS cluster may set one or more preferences or selections for how the options are to be enabled or otherwise applied when a DNS nameserver 332 resolves DNS queries associated with the subscriber. Preferences or settings for a subscriber may be stored as subscriber information at subscriber database 350 or in one or more storage devices accessible to the DNS cluster 330. Upon identifying a subscriber, subscriber information associated with the subscriber identifier may be used to alter the IP address in a DNS response. For example, a subscriber may establish subscriber information that instructs the DNS nameserver to alter responses to DNS requests that are associated with adult web sites, potential phishing or pharming sites, or other sites deemed inappropriate by the subscriber or to which the subscriber wishes to block or filter access, etc. Web server 334 and nameserver 332 each have access to subscriber database 350. In FIG. 3, the web server and nameserver utilize a single database but individual databases containing the same or similar information may be used in other embodiments.

The subscriber information in database 350 may include network records 352 and/or user records 354 that are used to determine a particular IP address to resolve for a given domain name. The network and user records may each specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

Network records 352 specify preferences or selections for resolving domain name queries associated with a particular subscriber's network or networks 310. The subscriber may specify resolution preferences that will apply to all traffic originating at a network 310 associated with the subscriber in one embodiment. DNS nameserver 332 can use a network identifier, such as an IP address from which the DNS query was issued, to determine a corresponding network record 352. A subscriber may set permissions and preferences in network records to indicate that certain preferences can be bypassed by particular users of the subscriber's network. For example, an administrator for a corporate network 310 may set up network records 352 to allow certain users of network 310 to bypass particular preferences in the network records, such as those blocking access to certain domains. Alternatively or additionally, permissions and preferences for overriding network preferences may be included in user records 354.

User records 354 include subscriber information for individual users or entities using the services of DNS cluster 330. For example, a corporate subscriber may establish user records for multiple individuals within the organization to specify resolution preferences or selections that will apply to DNS requests issued by the user. DNS nameserver 332 can use a subscriber identifier such as a userid, token or other identifier to determine a corresponding network record 352 and/or user record 354 for a particular request. User records and network records may be used individually or together to determine a set of permissions or preferences for applying to any individual request for domain name information. It is noted that implementations need not include network records and user records and may simply include subscriber records.

The domain name records in cache 340 may be associated with or store one or more flags. A flag can be any indicator, marking, or symbol associated with a domain name. For example a binary indicator stored in the domain name record can be used. A flag may be used to identify various types of information for a particular domain. For example, a flag may be used to mark a domain name as suspicious or untrustworthy, such as a site engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain names according to their age-appropriateness. Flags can also be set in domain name records to cause requests for a particular domain names to be proxied. This can allow a subscriber to have traffic for certain domain names proxied, for example for logging, auditing and the like, while traffic for other domains is not proxied. Category information and/or flags can be maintained in other manners. For example, flags or category information can be provided in a general database or in the subscriber database.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain.

In one example, the DNS nameserver provides the client device with one or more internet protocol (IP) addresses or other domain name information associated with proxy service 336 on web server 334. In response to the client device's resource request for example, the proxy service can provide a block or landing page to the client device. A block or landing page may inform the subscriber that the requested domain is not accessible on their network. The block or landing page refers generally to any resource or information provided by the proxy service in response to a request for a target domain that is not an actual resource provided by the target domain. The proxy service may also proxy resource requests for a client device. The proxy service may authenticate a subscriber and/or user associated with the subscriber before providing a landing page or proxying resource requests from the subscriber for the target domain name.

Proxy service 336 can vary by implementation and include any suitable computing system such as a server, group, grid, or distributed platform of computer systems. The proxy service may include a cluster formed of an application server(s) and/or web server(s) in one example. The proxy service is formed of hardware and/or software configured as described for performing routing and proxying as part of network processing. Proxy service 336 can apply various proxy and security features to network requests from clients in response to DNS nameserver providing domain name information assigned to the proxy service 336. Proxy service 336 may block, redirect, or pass through network traffic based on subscriber information and target domain name information. The proxy service may block network requests associated with some domains by routing requests to a null interface to terminate the network traffic flow associated with a request. Proxy service 336 may directly route some network requests from client 312 to a server 320 without proxying, while proxying other requests on behalf of the client. The proxy service can issue one or more requests to a target server 320 using a destination IP address and return one or more resources to the client 312. The proxy service may block access to some network resources associated with a domain, while proxying requests for other network resources associated with the same domain.

Proxy service 336 applies subscriber preferences from a database 350 or other source of subscriber preferences in determining how to process client resource requests in one embodiment. Proxy service 336 accesses flags or other domain name information to determine whether a resource request from a subscriber should be proxied or blocked in accordance with the subscriber information. Proxy service 336 may access additional domain name information to be used in proxying client resource requests. Proxy service 336 can maintain identifications of flagged domain names, blocked domain names, and proxied domain names, etc. Additionally, the proxy service maintains information to permit selectively proxying and/or access to individual resources associated with a domain name in one embodiment. Subscriber information can be stored in any manner such as in a simple flat text file or using other organizations of data.

Proxy service 336 transparently authenticates subscribers based on a subscriber identifier received from the DNS nameserver. In one example, the proxy service 336 transparently authenticates a subscriber using a message exchange with the recursive DNS nameserver 332. When the DNS nameserver receives a DNS request for a target domain name, it determines whether the request from a particular subscriber for the target domain name should be routed to or otherwise handled by the proxy service 336. The nameserver may determine subscriber preferences or other subscriber information based on a subscriber ID received in the DNS request. The subscriber information is compared with any flags in the domain name information for the target domain name to determine whether to provide domain name information for the target domain, or alternate domain name information for proxy service 336.

If the request should be handled by proxy service 336, nameserver 332 sends a message including the subscriber identifier to the proxy service. The message optionally includes additional information such as the target domain name associated with the DNS request, and subscriber information associated with the subscriber identifier at the DNS cluster.

Proxy service 336 receives the message from nameserver 332 including the subscriber identifier and optional additional information. Proxy service 336 determines an available IP address from pool of IP addresses reserved by the proxy service. IP address pool 304 contains a plurality of IP addresses that are assigned to or otherwise route to proxy service 336. Proxy service 336 controls a temporary association of a selected IP address from the pool with a subscriber identifier. In this manner, proxy service 336 may use the pool of IP addresses to uniquely identify subscribers across the DNS cluster 330. Moreover, proxy service 336 may associate the selected IP address with the target domain name of the client DNS request forwarded by the DNS nameserver. The DNS cluster 330 may uniquely identify a client and target domain name combination by using a unique IP address from the pool.

The proxy service associates the selected IP address with the particular subscriber identifier and target domain name combination identified in the message from the nameserver 332. The proxy service may store the subscriber identifier and the target domain name received from the DNS nameserver with the selected IP address in an IP address mapping table 308.

After associating a selected IP address from the pool with the subscriber identifier and the target domain name in the DNS request, the proxy service 336 generates a response message to the DNS nameserver. The message includes the selected IP address and an indication of the message from the DNS nameserver to which the selected IP address applies. For example, the proxy service may include the mapping of the selected IP address to the subscriber identifier and the target domain name as stored by the proxy service. In another example, the response message includes a direct identification of the message from the DNS nameserver such that only the selected IP address is sent in the response message.

The DNS nameserver receives the response message from the proxy service and extracts the selected IP address. The DNS nameserver generates a DNS response to the client device including the selected IP address as alternate domain name information for the target domain name. The client device receives the DNS response containing the selected IP address for the target domain name. This results in the resolver at the client device returning the selected IP address in response to resource requests for the target domain. The client then issues one or more resource requests for the target domain name using the selected IP address received from DNS nameserver 332.

The proxy service receives a resource request from the client device having the selected IP address. The proxy service compares the selected IP address in the resource request with the mapping table 308. When a resource request is received having a destination IP address that is current in the mapping table 308, the proxy service 334 determines the subscriber identifier from the corresponding entry in the mapping table 308. The proxy service determines subscriber information from database 350 and domain name information or other information associated with the target domain name. The proxy service may also determine information relating to a specifically requested resource associated with the target domain, for example by examining a universal resource indicator provided in the request.

The proxy service correlates the subscriber information with the domain name information to determine how to handle the resource requests. The proxy service may drop a network packet from a client, redirect a network packet to an alternate resource, or proxy the request and retrieve the requested resource on behalf of the client. It is noted that the proxy service may skip the determination of subscriber information in some instances. For example, the proxy service may contain domain name information including lists of domains for which traffic should always be allowed without proxying, lists of domains for which traffic should always be dropped, or lists of domains for which traffic should be proxied. The proxy service may process this traffic without using subscriber information. The presence of a domain name on a list of allowed, blocked, or proxied domains may be indicated using a flag in the domain name information as earlier described.

Figure 4:
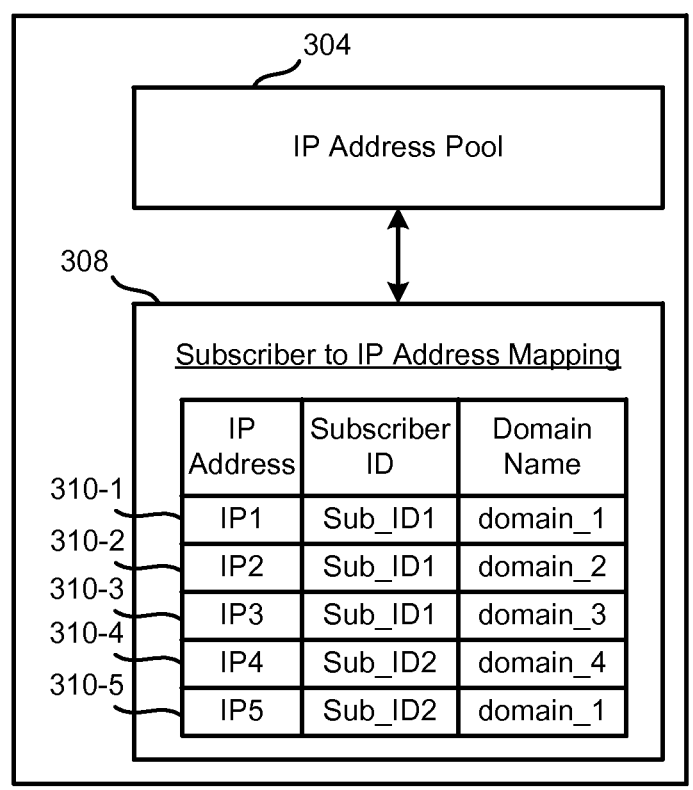
FIG. 4 is a block diagram depicting a mapping table of IP addresses to subscriber and domain combinations according to one embodiment.

FIG. 4 depicts one example of a table 308 including a mapping of IP addresses from an IP address pool 304 to particular subscribers. In the specific example, table 308 includes mappings of IP addresses to combinations of subscriber identifiers and domain names. Table 308 includes a plurality of entries 310 representing a current assignment of IP addresses from pool 304 to subscriber/domain combinations. The mapping is dynamic so that IP addresses may be reused. For example, IP addresses may be placed into list of available IP addresses based on expiration of a predetermined time or another event and taken out of the list when currently assigned to a subscriber identifier and domain combination. Each entry 310 in table 308 includes the selected IP address from the IP address pool 304 (e.g., IP1), and a combination of the subscriber identifier (e.g., Sub_ID1) and target domain name (e.g., domain_1) from the DNS request that has been associated with the selected IP address. When a resource request is received using the selected IP address, the proxy service can access table 304 to determine the subscriber identifier and the target domain name associated with the request.

The specific entries in FIG. 4 are examples highlighting a number of features associated with the mapping table. Entries 510-1, 510-2, and 510-3 are each associated with the same subscriber identifier Sub_ID1. Entries 510-4 and 510-5 are associated with a different subscriber identifier Sub_ID2. For the first subscriber identifier, three entries are created that correspond to three domains—domain_1, domain_2, and domain_3—for which the DNS cluster has received requests for domain name information from the subscriber Sub_ID1. The proxy service assigns three different IP addresses corresponding to the requests received for the three different domains. This enables the proxy service 336 to uniquely identify the subscriber identifier as well as the requested domain name by examining the IP address of a resource request later received from the client 312. In another example, the proxy service may use a single IP address to identify a subscriber for multiple domains. The proxy service can use the content of the later received resource request to identify the target domain.

For the second subscriber identifier, two entries are created that correspond to two domains—domain_4 and domain_1. Entry 510-4 is associated with a fourth domain name domain_4. Entry 510-5 is associated with the first domain domain_1. The proxy service assigns fourth and fifth IP addresses IP4 and IP5 to the entries for domain_4 and domain_1. Notably, entry 510-5 and 510-1 both correspond to the same target domain name domain_1. The entries are assigned different IP addresses based on the different subscriber identifier to which they are associated. In this manner, the system can seamlessly determine the subscriber identifier associated with network traffic for the target domain name.

Figure 5:
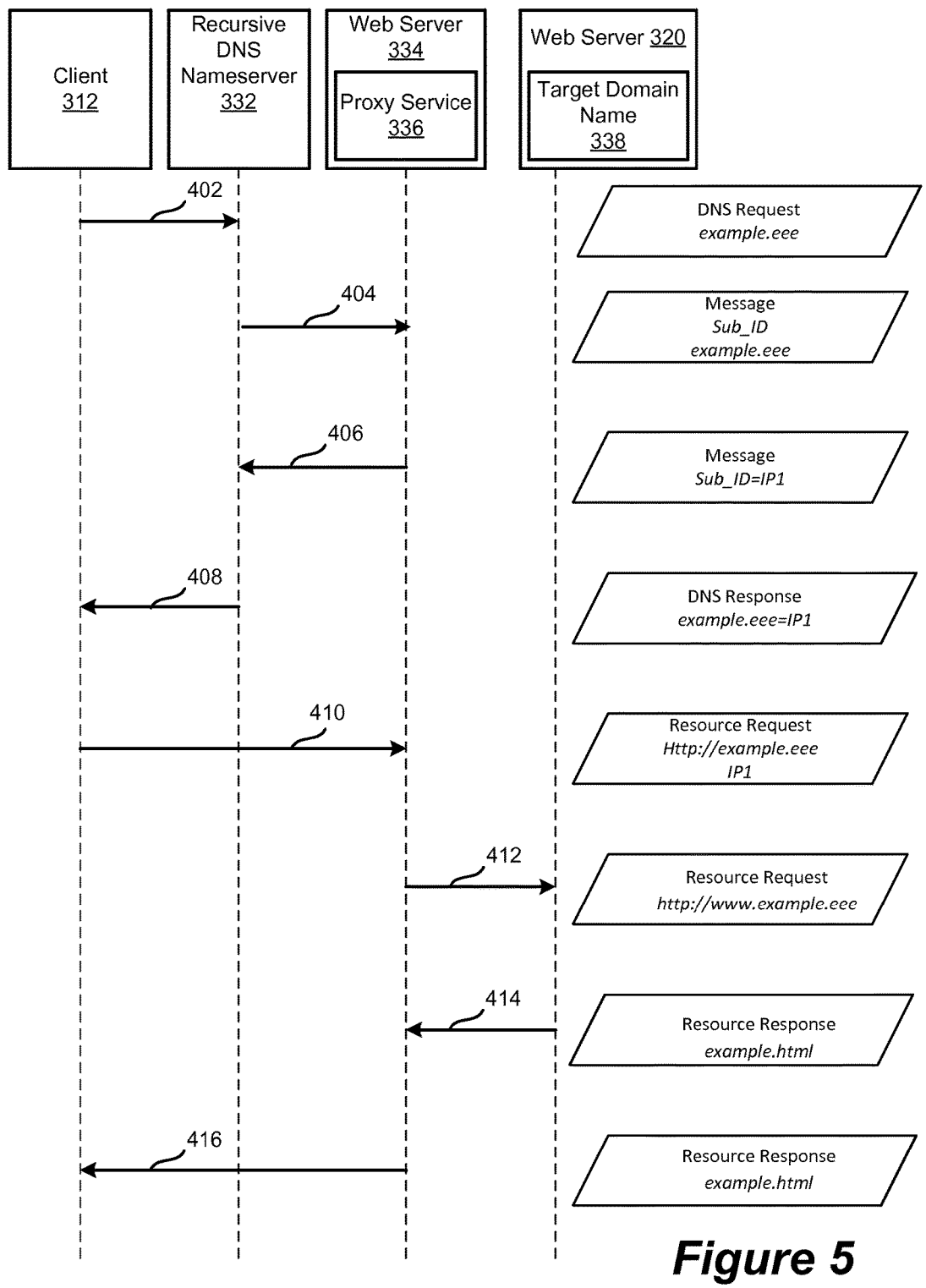
FIG. 5 is a timing diagram depicting traffic for processing a DNS request and resource request using internet protocol addressing according to one embodiment.

FIG. 5 is a diagram depicting traffic between a client device 312, recursive DNS nameserver 332, proxy service 336, and web server 320 associated with a target domain name 338 in one example. The process begins when a subscriber or user associated with a subscriber (hereinafter subscriber), issues a domain name system (DNS) request 402 to a recursive DNS nameserver 332 via a client 312. A specific example is provided where request 402 is issued for the domain name information of a target domain name "example.eee." It is noted that the examples used herein are intended to be fictitious and are provided only to better illustrate the disclosed technology with respect to specific examples.

The nameserver determines a subscriber ID associated with the DNS request. In one example, the nameserver determines a userid or token passed with the DNS request as earlier described. Using the subscriber ID, the nameserver obtains subscriber information, such as a network record and/or user record from database 350, for a particular subscriber associated with the DNS request.

Nameserver 332 also obtains domain name information for the target domain name. The nameserver may acquire a domain name record for the target domain name from cache 340 in one example. If a domain name record is not available for the requested domain name, the nameserver may recursively resolve the domain name information by issuing a request to one or more root, authoritative and/or other recursive domain nameservers.

Subscriber information including user records and/or network records can be used with the domain name information to determine how to respond to the DNS request. The target domain name may be associated with one or more flags corresponding to one or more preferences of the subscriber. Based on a correlation of subscriber information and domain name information, nameserver 332 determines how to respond to the client device 312. In this example, the subscriber information indicates that the subscriber or user associated with the subscriber should not access the target domain name directly, but instead should be routed to proxy service 336 for handling resource request associated with the target domain name.

In response to determining that client 312 access to the target domain should be handled by proxy service 336, nameserver 332 generates a message 404 to proxy service 336. Message 404 may include various formats and types of information relating to client request 402. Nameserver 332 forwards the subscriber identifier determined for the original request, and optionally the original request 402, target domain name, and/or additional subscriber information. Message 404 is a unicast message in one embodiment, having a payload that includes the subscriber identifier.

In response to message 404, proxy service 336 determines an available IP address from IP address pool 304. Proxy service 336 associates the selected IP address IP1 with the subscriber identifier for the original DNS request 402 and the target domain name in the DNS request. In one embodiment, proxy service 336 generates an entry 310 in a table 308 that includes a mapping of IP addresses to subscriber identifier and domain name combinations as shown in FIG. 4. The entry 310 is created for the combination of the subscriber identifier and the target domain name.

After creating the entry in table 308, proxy service 336 generates message 406 in reply to the message 404 from nameserver 332. Message 406 identifies the IP address that has been associated with the subscriber identifier and target domain name at the proxy service. Message 406 may include various information. For example, message 406 may identify message 404 from the nameserver 332 and/or DNS request 402 from the client. Message 406 may include the subscriber identifier and/or the target domain name. Message 406 includes the mapping of the selected IP address to the subscriber identifier and target domain name combination in one embodiment.

Nameserver 332 receives the IP address and optionally the additional information from the proxy service and generates a DNS response 408 to client 312. DNS response 408 includes the IP address received from the proxy service. In this manner, nameserver 332 generates a reply for a DNS request for the target domain name having the IP address received from the proxy service. While uniquely identifying the combination of the particular subscriber identifier and target domain name, the IP address routes to or is otherwise assigned to the proxy service through the domain name system.

Nameserver 332 may store the mapping from the IP address to the subscriber/domain combination. This enables future DNS replies from the subscriber for the target domain to be generated with the IP address from the proxy service automatically without issuing a message 404 and receiving a reply 406. Nameserver 332 can maintain the IP address to subscriber/domain name mapping for a predetermined time, such as that specified in a TTL set for the target domain name for example. The predetermined time may be set by the proxy service in one example.

In response to DNS response 408, client 312 issues a resource request 410 to proxy service 336 for the target domain name. The resource request includes the selected IP address from proxy service 336 such that the resource request for the target domain name is routed to the proxy service 336. Proxy service 336 receives the request 410 and determines the selected IP address. Based on the selected IP address, proxy service 336 determines the subscriber identifier and optionally, additional subscriber information for the subscriber. Proxy service 336 correlates the subscriber information with the target domain name to determine how to respond to the client device. Proxy service 336 can authenticate the subscriber and determine how to respond to request 410 using subscriber information such as user and/or network records associated with the subscriber identifier as earlier described.

In FIG. 5, an example is shown where proxy service 336 issues one or more requests 412 to a web server 320 for the target domain name 338. The proxy service 336 may determine the assigned IP address for the target domain name by issuing a DNS request to nameserver 332. In response to a resource request 412 for the target domain name, proxy service 336 receives one or more replies 414 including requested resources. Proxy service 336 generates a response 416 to the client 312, passing the requested resource(s) received from the web server 320 of the target domain name 338. The proxy service may determine whether network packets for the target domain name should be audited or logged. The proxy service may store records of network packet traffic by a subscriber, or use the network packet to determine information relating to the target domain name for future routing decisions.

If the proxy service determines that the subscriber is not permitted access to the target domain name, a block or landing page can be provided to the client device. It is noted that while the example of FIG. 5 describes applying subscriber information to generate a response to the client's resource request, this is not required. For example, the proxy service may simply determine the subscriber identifier and begin proxying requests from the client 312 for the target domain name without accessing or analyzing subscriber information such as preferences and policies.

Figure 6:
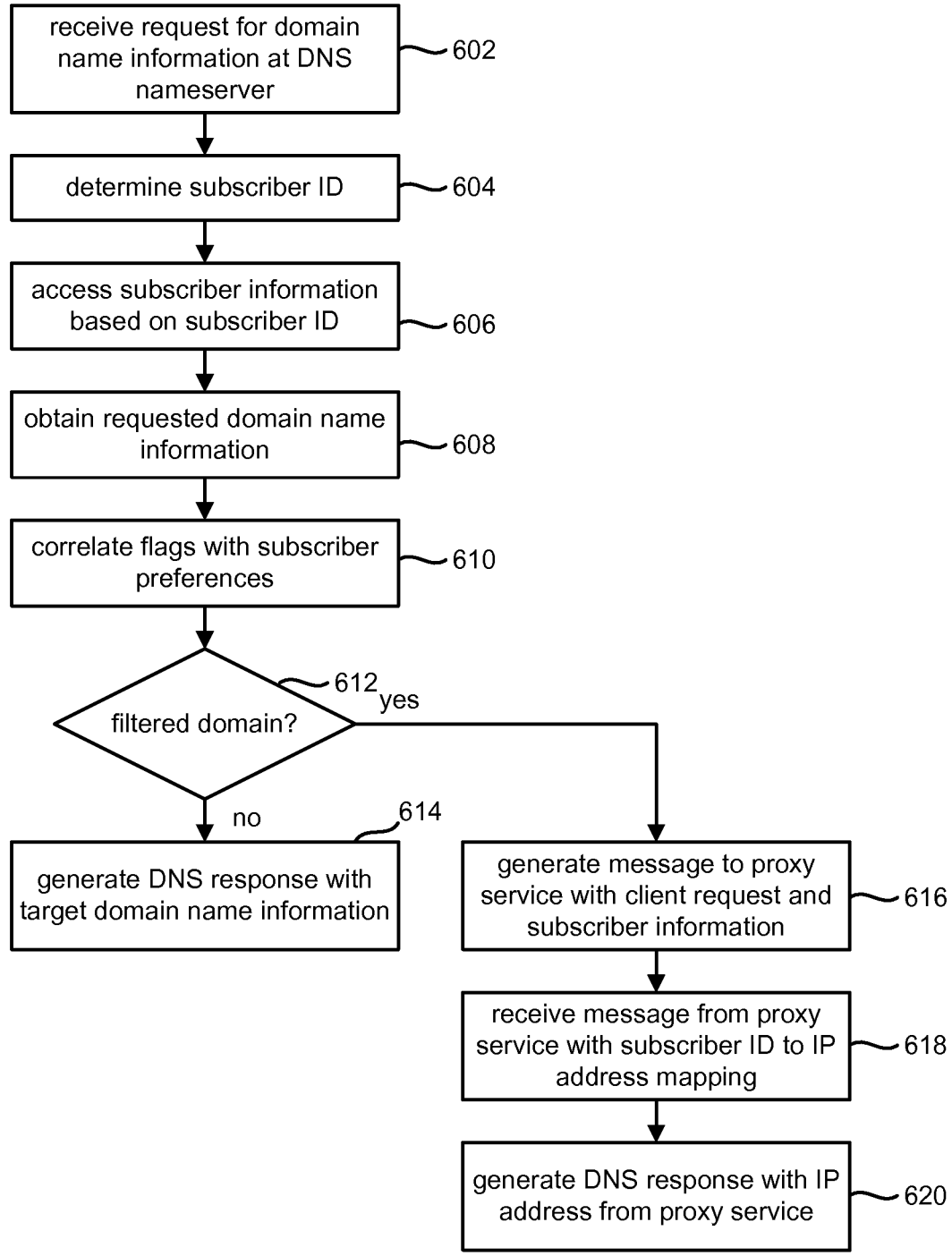
FIG. 6 is a flowchart describing a method of processing DNS requests in accordance with one embodiment.

FIG. 6 is a flowchart describing a method of processing domain name requests by a recursive DNS nameserver in accordance with one embodiment. At step 602, the DNS nameserver 332 receives a request (e.g., 402) for domain name information from a client device 312. The nameserver determines a subscriber identifier associated with the DNS request at step 604. In one example, the nameserver parses the DNS request for the source IP address which is used as the subscriber identifier. In another example, a token or the subscriber ID itself may be passed with the DNS request such as by using an EDNS extension. At step 606, the DNS nameserver uses the subscriber identifier to obtain subscriber information (e.g, network record 352 and/or user record 354) corresponding to the subscriber identifier from database 350. At step 608, the DNS nameserver obtains the requested domain name information. Step 608 may include determining the domain name in the request and checking cache 340 for a domain name record corresponding to the target domain name. If the cache contains a domain name record for the target domain name and the record is not expired, the DNS nameserver obtains the cached domain name record. If the cache does not contain a domain name record for the target domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the user and/or network records 352 at step 610. Step 610 includes determining whether the domain name information for the requested domain includes any identifiers corresponding to preferences in the network record. For example, step 610 may include determining an age-rating for the domain and comparing that with an age-rating preference in the network record.

If any of the flags correlate to preferences in the network record, the DNS nameserver determines if any of the flags and corresponding network preferences indicate that the traffic to the domain should be filtered at step 612. In one embodiment, step 612 includes determining whether the network records indicate that the requested domain should be blocked for requests from the subscriber's network. Step 612 may also include determining whether the records indicate that traffic for the requested domain should be proxied, but access still allowed.

If the domain is not to be blocked or proxied, the DNS nameserver issues a DNS response at step 614 with domain name information for the requested domain. If, however, the domain name information contains a flag or other indication that when correlated with the subscriber information indicates that network traffic for the target domain name should be proxied or blocked, the DNS nameserver generates a message at step 616 to the proxy service. The message includes the subscriber identifier in one embodiment, but may additionally include other subscriber information and/or other information such as the original DNS request received at step 602. After issuing the message to the proxy service, the DNS nameserver receives a response message at step 618. The response message includes a uniquely selected IP address for the message sent by the DNS nameserver. The message may include a mapping of the subscriber identifier from the message at step 616 to the selected IP address. The message may omit the subscriber identifier in one example, such as where the message received at step 618 has a direct correlation to the message sent at step 616. For example, the response message may identify the request message using a unique identification for the request and response messages. At step 620, the DNS nameserver generates a DNS response for the request received at step 602. The DNS response includes the IP address received from the proxy service at step 618. The IP address is assigned to the proxy service through the DNS such that a subsequent resource request from the client for the target domain name will be directed to the proxy service 336.

Figure 7:
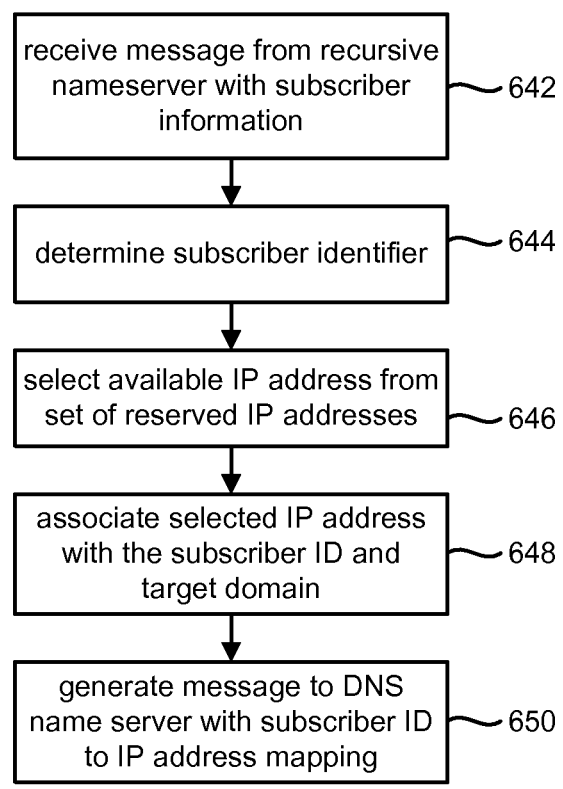
FIG. 7 is a flowchart describing a method of uniquely identifying subscriber and domain combinations according to one embodiment.

FIG. 7 is a flowchart describing processing by proxy service 336 in response to a nameserver request message according to one embodiment. For example, the process of FIG. 7 may be performed after receiving a request message issued by the DNS nameserver at step 616 of FIG. 6. At step 642, the proxy service receives a message from the DNS nameserver including subscriber information determined by the DNS nameserver in response to a DNS request. The subscriber information may include the subscriber identifier and the message may optionally include the target domain name of the DNS request, additional subscriber information, and/or the original DNS request itself as forwarded by the nameserver.

At step 644, the proxy service determines the subscriber identifier. As earlier describer, the proxy service can also determine the target domain name information at step 644 if provided in the message from the nameserver. At step 646, the proxy service selects an available IP address from a set of reserved IP addresses that are assigned to the proxy service. The available IP address is an IP address in a pool of reserved addresses that are not currently assigned to another DNS transaction.

At step 648, the proxy service creates an association between the selected IP address and the DNS request. For example, the proxy service may generate an entry in a mapping table to map the selected IP address to the combination of the subscriber identifier and the target domain name from the DNS request. As earlier described, the proxy service may map the selected IP address to the subscriber identifier for multiple target domain names in another example.

At step 650, the proxy service generates a message to the DNS nameserver including the selected IP address for the DNS request. The message includes the mapping of the selected IP address to the subscriber identifier and/or target domain name in one example.

Figure 8:
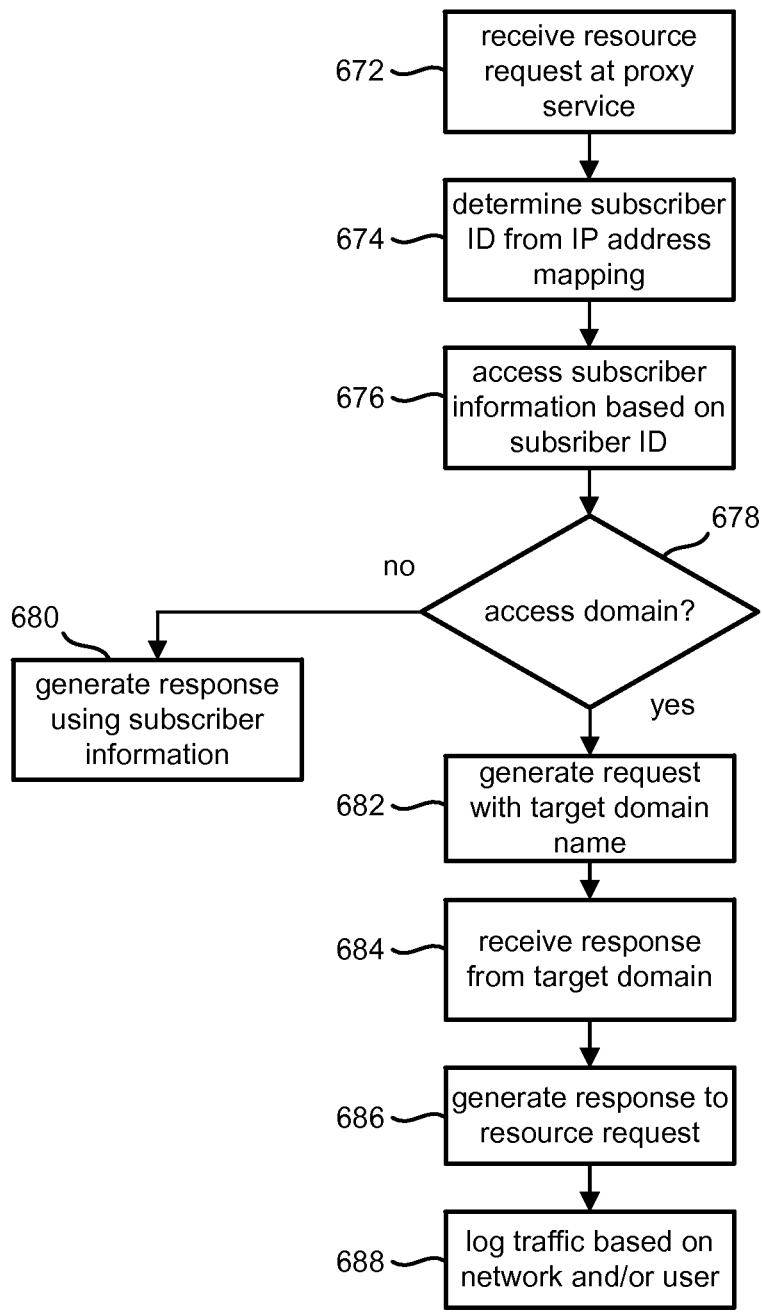
FIG. 8 is a flowchart describing a method of processing resource requests in accordance with one embodiment.

FIG. 8 is a flowchart describing processing of client resource requests by a proxy service 336 according to one embodiment. At step 672, the proxy service receives a resource request. Step 652 may include resource requests using any type of protocol. The resource request, such as a packet, may be transmitted using any available protocol and is not limited to HTTP/HTTPS traffic for example. The proxy service may be configured to accept packets that use any protocol, whether known or unknown.

The proxy service determines a subscriber identifier for the request at step 674. The proxy service accesses the IP address included in the resource request in one embodiment. Using the IP address, the proxy service determines the subscriber identifier from the corresponding entry in mapping table 508 for the IP address.

At step 676, the proxy service optionally accesses subscriber information such as user records and/or network records corresponding to the subscriber identifier. At step 676, the proxy service uses the subscriber information to determine how to respond to the resource request. As with the DNS nameserver, the proxy service may determine if the domain name record for the target domain contains any flags. The proxy service may correlate the subscriber preferences and policies with any flags to determine whether the requested resource should be retrieved for the client device from the target domain.

If the proxy service determines that the subscriber or user associated with the subscriber should not access the target domain name, the proxy service generates a response to the request at step 680. The proxy service can provide a block or landing page to the client device, for example, informing the subscriber that the requested domain is not accessible to them. The block or landing page refers generally to any resource or information provided by the proxy service in response to a request for a target domain that is not an actual resource provided by the target domain. The response may include a redirect URI to a block or landing page in one example.

If the proxy service determines that the subscriber or user can access the target domain, the proxy service issues a request at step 682 for the target domain name. The request at step 682 may be a resource request indicated by the URI of the request received at step 672. The proxy service proxies the resource request by issuing its own request to the requested domain. At step 684, the proxy service receives a response from the target domain with a resource indicated by the request URI. At step 686, the proxy service generates a response to the resource request including the resource from the target domain. The proxy service may optionally log the traffic for auditing, etc. at step 688. Step 688 can include logging and associating the traffic with a particular user of client device 312 or only with a subscriber network 310.

Figure 9:
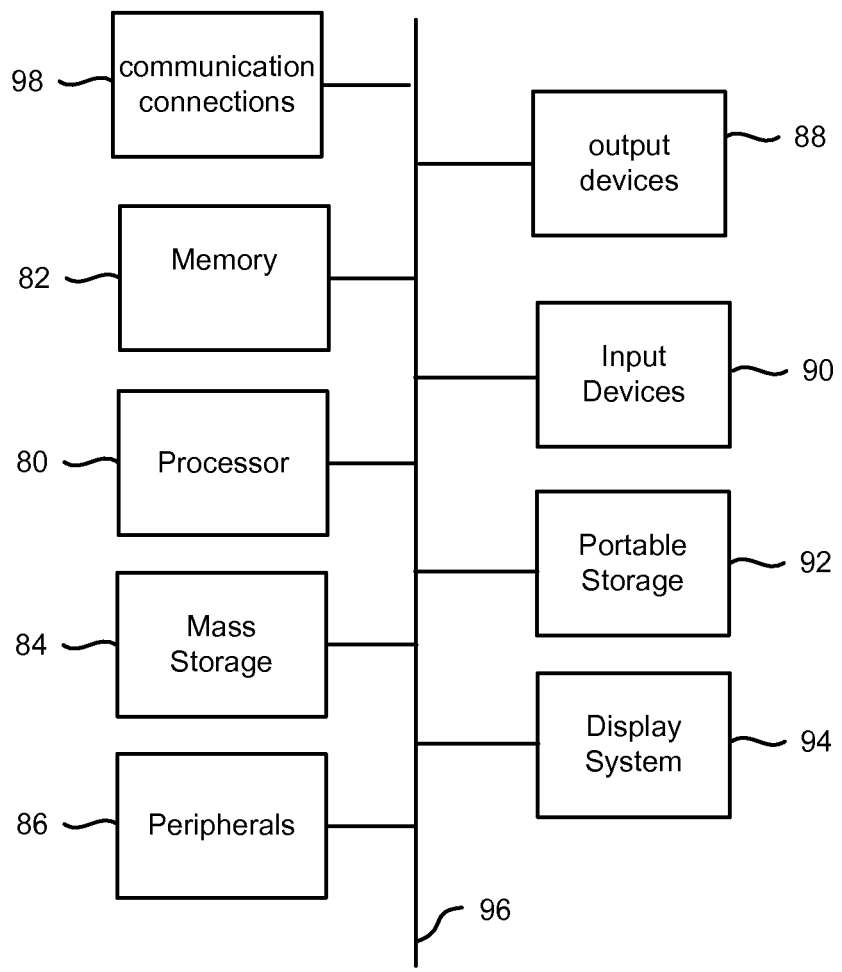
FIG. 9 is a simplified block diagram of a computing device that can be used to implement various embodiments of the disclosed technology.

FIG. 9 is a high level block diagram of a computing system which can be used to implement any of the computing devices of FIG. 3. The computing system of FIG. 9 includes processor 80, memory 82, mass storage device 84, peripherals 86, output devices 88, input devices 90, portable storage 92, and display system 94. For purposes of simplicity, the components shown in FIG. 9 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 9. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 9 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the proxy service, can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data in a non-transitory form. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Figure 10:
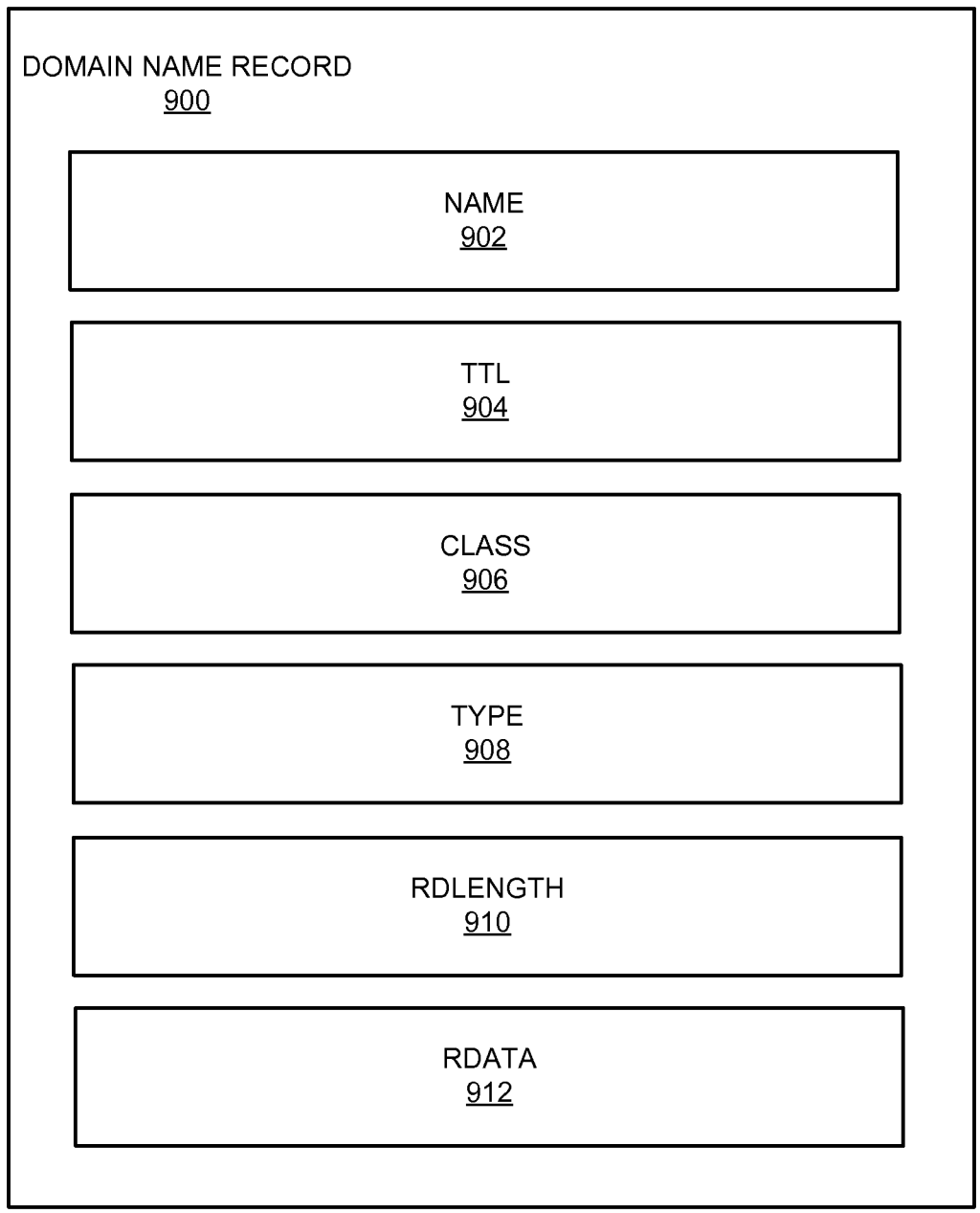
FIG. 10 depicts the structure of an example of a DNS resource record.

FIG. 10 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 11:
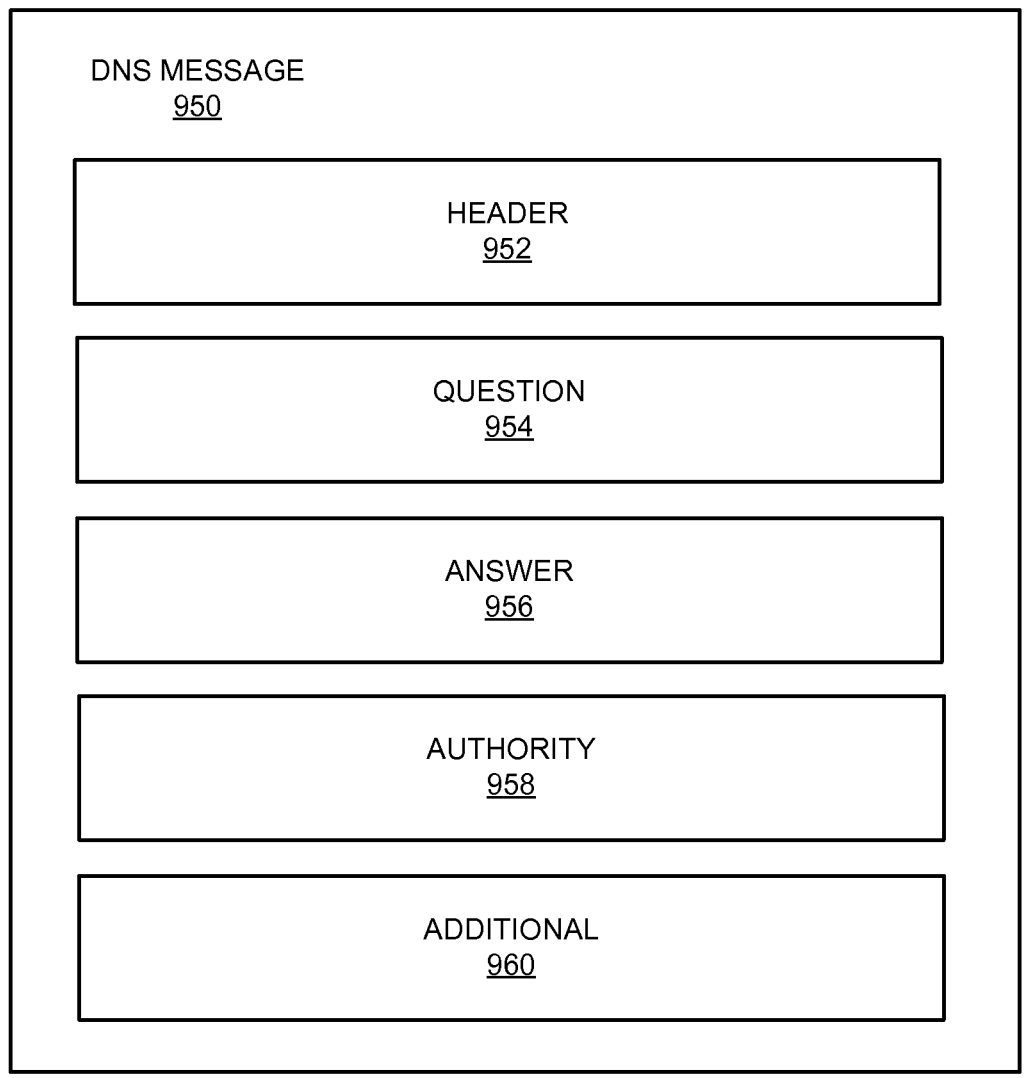
FIG. 11 depicts the structure of an example of a DNS message.

FIG. 11 is a block diagram depicting the structure of a DNS message response or request 950. A DNS message includes a header field 952, a question section 954, an answer section 956, an authority section 958 and an additional section 960. The question section indicates the question for (or request) of the nameserver in a DNS request. The question field in a DNS response includes one or more resource records answering a question from a DNS request. The authority section includes one or more resource records pointing to an authority. The additional section is structured like a resource record and can include various types of information, such as the subscriber identifier as described above. In one example, the additional section includes an OPT RR containing zero or more key/value pair that might describe subscriber id information such as device id, etc.

Accordingly, there is described a method of processing network traffic that includes receiving at a proxy service a message from a domain name system (DNS) name server corresponding to a DNS request from a client, the message from the DNS nameserver including a subscriber identifier and a target domain name, selecting from a set of IP addresses assigned to the proxy service a first IP address, associating the first IP address with the subscriber identifier and the target domain name at the proxy service, and generating a message to the DNS nameserver from the proxy service including the first IP address for the first DNS request.

There is described a method of computer network processing that includes receiving at a DNS nameserver a request for domain name information associated with a target domain name, determining a subscriber identifier associated with the request for domain name information, generating a message to a proxy service from the DNS nameserver based on the request for domain name information and the subscriber identifier, receiving from the proxy service a message associated with the request for domain name information where the message from the proxy service includes a first IP address from a set of IP addresses assigned to the proxy service, and generating a response to the request for domain name information associated with the target domain name including the first IP address.

A system is described that includes one or more computer-readable storage devices storing a plurality of subscriber identifiers and one or more subscriber preferences associated with each subscriber identifier, and one or more servers including one or more processors in communication with the one or more computer-readable storage devices. The one or more processors are configured to receive at a proxy service a message from a DNS nameserver corresponding to a DNS request from a client where the message from the DNS nameserver includes a first subscriber identifier and a target domain name. The one or more processors are configured to select from a set of reserved IP addresses a first reserved IP address, generate an association of the first reserved IP address with the subscriber identifier and the target domain name at the proxy service, and generate a message to the DNS nameserver from the proxy service including the first reserved IP address for the first DNS request.

A system is described that includes one or more computer-readable storage devices storing domain name information for a plurality of domains and one or more domain name servers including one or more processors in communication with the one or more computer-readable storage devices. The one or more processors are configured to receive a request for domain name information associated with a target domain name, determine a subscriber identifier associated with the request for domain name information, generate a message to a proxy service from the DNS nameserver based on the request for domain name information and the subscriber identifier, and receive from the proxy service a message associated with the request for domain name information. The message from the proxy service includes a first IP address from a set of IP addresses. The one or more processors are configured to generate a response to the request for domain name information associated with the target domain name including the first reserved IP address.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of computer network processing, comprising:
   receiving at a proxy service a message from a domain name system (DNS) name server corresponding to a DNS request from a client, the message from the DNS nameserver including a subscriber identifier and a target domain name;
   selecting from a set of IP addresses assigned to the proxy service a first IP address;
   associating the first IP address with the subscriber identifier and the target domain name at the proxy service; and
   generating a message to the DNS nameserver from the proxy service including the first IP address for the first DNS request.

2. The method of claim 1, further comprising:
   receiving at the proxy service a resource request associated with the target domain name, the resource request including the first IP address;
   determining the subscriber identifier based on said associating the first IP address with the subscriber identifier and the target domain name; and
   generating a response to the resource request associated with the target domain name based on the subscriber identifier.

3. The method of claim 2, further comprising:
   determining one or more preferences associated with the subscriber identifier for proxying network traffic;
   wherein generating the response to the request associated with the target domain name is based on the one or more preferences.

4. The method of claim 2, wherein the client is a first client, the subscriber identifier is a first subscriber identifier, the message from the DNS name server is a first message from the DNS nameserver, the message to the DNS nameserver is a first message to the DNS name server, and the DNS request is a first DNS request, the method further comprising:
   receiving at the proxy service a second message from the DNS nameserver corresponding to a second DNS request from a second client, the second message from the DNS nameserver including a second subscriber identifier and the target domain name;
   selecting from the set of IP addresses a second IP address;
   associating the second IP address with the second subscriber identifier and the target domain name at the proxy service;
   generating a second message to the DNS nameserver from the proxy service including the second IP address for the second DNS request;
   receiving at the proxy service a second resource request associated with the target domain name, the second request including the second IP address;
   determining the second subscriber identifier based on said associating the second IP address with the second subscriber identifier and the target domain name; and
   generating a second response to the second request associated with the target domain name based on the second subscriber identifier.

5. The method of claim 1, further comprising:
   receiving the DNS request for domain name information for the target domain name at the DNS nameserver, the request for domain name information being associated with the subscriber identifier;
   generating the message to the proxy service in response to the request for domain name information for the target domain name;
   receiving the message from the proxy service including the first IP address for the DNS request; and
   generating a response to the DNS request including the first IP address for the target domain name.

6. The method of claim 1, wherein:
   the message to the DNS nameserver includes a mapping of the first IP address to the subscriber identifier.

7. The method of claim 6, wherein:
   the mapping maps the first IP address to a combination of the subscriber identifier and the target domain name.

8. The method of claim 1, wherein:
   associating the first IP address with the subscriber identifier and the target domain name at the proxy service comprises storing a mapping of the first IP address to the subscriber identifier and the target domain name.

9. A method of computer network processing, comprising:
   receiving at a DNS nameserver a request for domain name information associated with a target domain name;
   determining a subscriber identifier associated with the request for domain name information;
   generating a message to a proxy service from the DNS nameserver based on the request for domain name information and the subscriber identifier;
   receiving from the proxy service a message associated with the request for domain name information, the message from the proxy service including a first IP address from a set of IP addresses assigned to the proxy service; and
   generating a response to the request for domain name information associated with the target domain name including the first IP address.

10. The method of claim 9, wherein:
    the message to the proxy service includes the target domain name and the subscriber identifier.

11. The method of claim 10, wherein:
    the message to the proxy service includes a forward of the request for domain name information.

12. The method of claim 11, wherein:
    the message from the proxy service includes a mapping of the subscriber identifier to the first IP address.

13. The method of claim 9, wherein:
determining the subscriber identifier includes accessing the subscriber identifier from the request for domain name information for the target domain name.

14. The method of claim 9, wherein:
determining the subscriber identifier includes accessing the subscriber identifier from a database at the DNS nameserver based on information from the request for domain name information.

15. The method of claim 9, further comprising:
determining whether the target domain name is on one or more lists of domains to be proxied; and
wherein generating the message to the proxy service is based on the target domain name being on the one or more lists.

16. The method of claim 9, further comprising:
determining one or more preferences associated with the subscriber identifier;
wherein generating the message to the proxy service is based on the one or more preferences associated with the subscriber identifier.

17. A system, comprising:
one or more computer-readable storage devices storing a plurality of subscriber identifiers and one or more subscriber preferences associated with each subscriber identifier; and
one or more servers including one or more processors in communication with the one or more computer-readable storage devices, the one or more processors are configured to receive at a proxy service a message from a DNS nameserver corresponding to a DNS request from a client, wherein the message from the DNS nameserver includes a first subscriber identifier and a target domain name, the one or more processors are configured to select from a set of reserved IP addresses a first reserved IP address, generate an association of the first reserved IP address with the subscriber identifier and the target domain name at the proxy service, and generate a message to the DNS nameserver from the proxy service including the first reserved IP address for the first DNS request.

18. The system of claim 17, wherein:
the one or more processors are configured to receive at the proxy service a resource request associated with the target domain name, the resource request including the first reserved IP address;
the one or more processors are configured to determine the subscriber identifier based on the association of the first reserved IP address with the subscriber identifier and the target domain name; and
the one or more processors are configured to generate a response to the resource request associated with the target domain name based on the subscriber identifier.

19. The system of claim 18, wherein:
the client is a first client, the message from the DNS name server is a first message from the DNS nameserver, the message to the DNS nameserver is a first message to the DNS name server, and the DNS request is a first DNS request;
the one or more processors are configured to receive at the proxy service a second message from the DNS nameserver corresponding to a second DNS request from a second client, the second message from the DNS nameserver including a second subscriber identifier and the target domain name; and
the one or more processors are configured to select from the set of IP addresses a second IP address, generate an association of the second IP address with the second subscriber identifier and the target domain name at the proxy service, generate a second message to the DNS nameserver from the proxy service including the second reserved IP address for the second DNS request, receive at the proxy service a second resource request associated with the target domain name including the second reserved IP address, determine the second subscriber identifier based on said associating the second reserved IP address with the second subscriber identifier and the target domain name, and generate a second response to the second request associated with the target domain name based on the second subscriber identifier.

20. A system, comprising:
one or more computer-readable storage devices storing domain name information for a plurality of domains; and
one or more domain name servers including one or more processors in communication with the one or more computer-readable storage devices, the one or more processors are configured to receive a request for domain name information associated with a target domain name, determine a subscriber identifier associated with the request for domain name information, generate a message to a proxy service from the DNS nameserver based on the request for domain name information and the subscriber identifier, and receive from the proxy service a message associated with the request for domain name information, wherein the message from the proxy service includes a first reserved IP address from a set of reserved IP addresses, the one or more processors are configured to generate a response to the request for domain name information associated with the target domain name including the first reserved IP address.

21. The system of claim 20, wherein:
the one or more processors are configured to determine one or more preferences associated with the subscriber identifier; and
the one or more processors are configured to generate the message to the proxy service based on the one or more preferences associated with the subscriber identifier.

* * * * *